Nov. 26, 1940.   T. P. McDERMOTT   2,223,115
SELF-CLOSING TEMPERATURE RELIEF VALVE
Filed Aug. 15, 1936   3 Sheets-Sheet 1

INVENTOR
Thomas P. McDermott
BY
Gardner W. Pearson
ATTORNEY

Nov. 26, 1940. T. P. McDERMOTT 2,223,115
SELF-CLOSING TEMPERATURE RELIEF VALVE
Filed Aug. 15, 1936 3 Sheets-Sheet 2
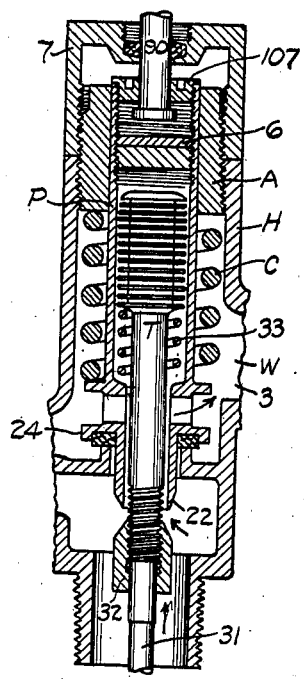
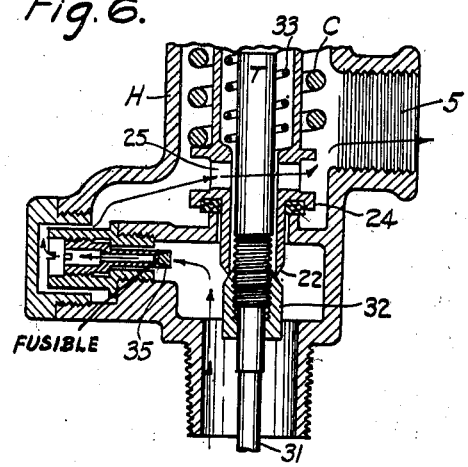
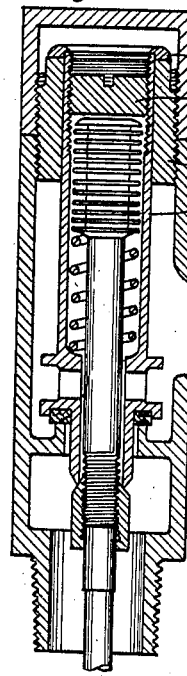
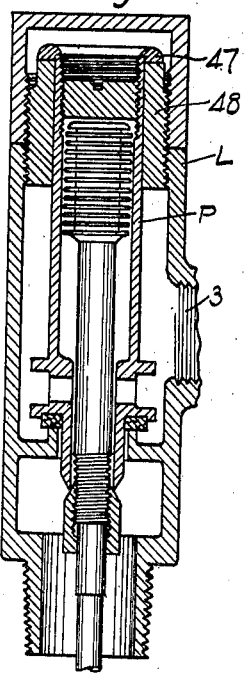
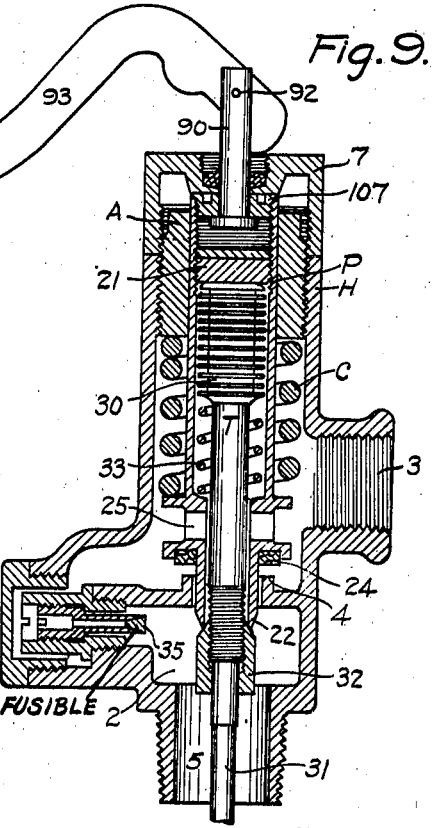

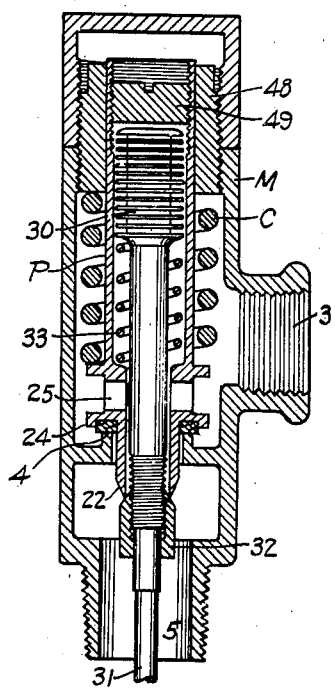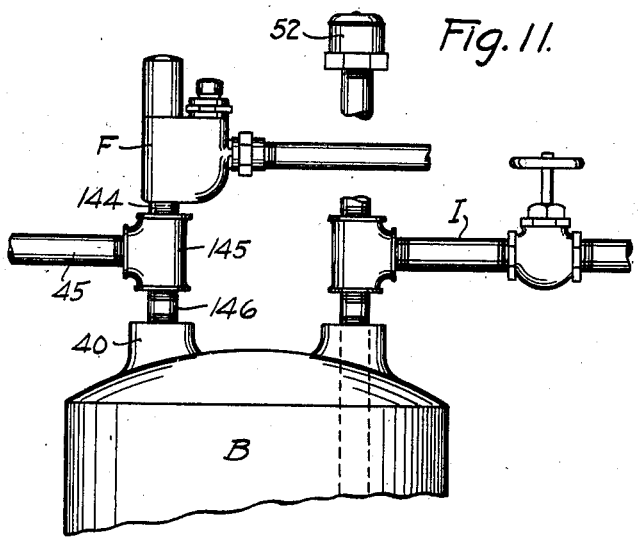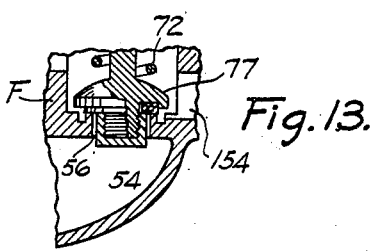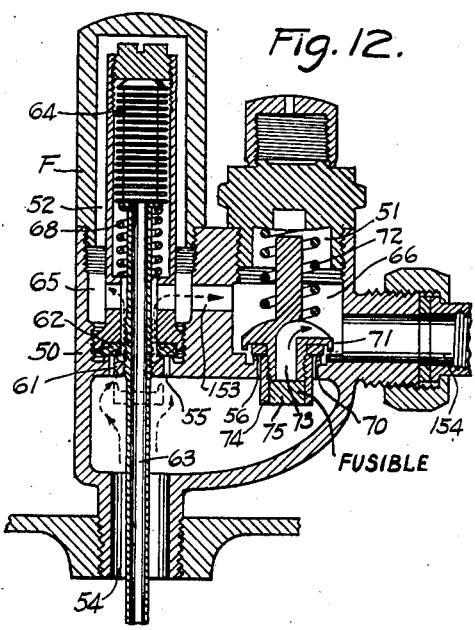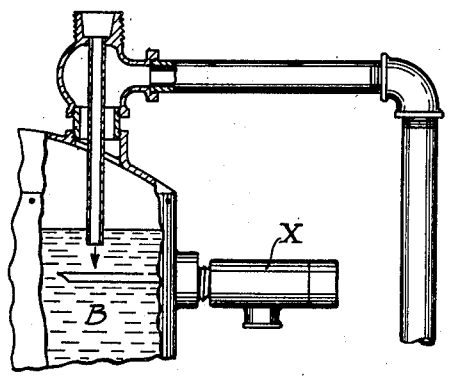

UNITED STATES PATENT OFFICE 2,223,115

SELF-CLOSING TEMPERATURE RELIEF VALVE

Thomas P. McDermott, Boston, Mass.

Application August 15, 1936, Serial No. 96,244

4 Claims. (Cl. 137—53)

This invention relates to automatic relief or safety valves such as are extensively used in connection with reservoir tanks of the type, for instance, which are used for storing the tap water for residences and in other places where a supply of tap water is desirable. Such tanks are usually called boilers.

As the temperature of water in such boilers is raised by the fuel, there is always danger that the water will boil, steam form and a dangerous pressure be created. Spring operated pressure release valves, vacuum valves and fusible plugs are all well known.

The main feature of this device is a self-seating temperature release valve operative by a thermostatic bellows which is located outside of the boiler but which has a sealed tube extending into the boiler so adjusted that at a certain temperature before steam is formed, it will quickly open a valve and allow the water to run out until its temperature has been reduced to a safe point when the valve automatically closes. As the temperature valve seat is on the inside, the parts are preferably so arranged that it will also act as a vacuum release valve and in the preferred construction, there is at the outside of the passage from the boiler, a pressure valve seat closed by a tubular stem which extends down through the seat into the inside of the boiler and which carries the temperature and vacuum valve seat while the thermostatic bellows extension carries the closure for the temperature and vacuum seat, whether that is carried by the tubular stem or is fixed.

The construction is such that there is little if any danger of the parts sticking or rusting together, but a fusible plug and an independent vacuum release valve can be used if extra precaution is needed.

Pressure relief valves are usually operated by a compression spring and reseat themselves, but fusible plugs, when once blown out, allow the water to run away for a long time until a new plug can be inserted. Other temperature relief valve devices release at a predetermined temperature, but do not reseat when the temperature is reduced.

The principal feature of this device is the provision of a temperature release mechanism which will allow the overheated water to escape, but if, for any reason, the pressure goes up, the pressure is quickly released, both valves opening in an emergency and both closing when the emergency is over.

With my preferred construction, when a vacuum is created in a boiler, the valve will open and relieve it and preferably, as an additional precaution, I may use a fusible plug.

The pressure valve seat and temperature release and vacuum valve seat are both concentric with a common axis, and the working parts are mostly out of contact with the water so that they do not tend to rust nor to plug up with sediment. The thermostatic device which operates the temperature relief valve consists of a bellows filled with a suitable liquid or fluid with a dead end tube which extends therefrom down through the valve seats into the water.

This is adjusted to release at about 190° Fahrenheit and as this permits the water at that temperature to rush out and further expand the bellows, the temperature release is very fast.

In the drawings, Fig. 1 is an elevation, partly in section, of a hot water tank or boiler showing the inlets and outlets and my valve in position.

Figs. 3, 4, 5, 6 and 9 are sectional elevations of the same valve shown in Figs. 1 and 2 with the parts in various positions.

Figs. 7, 8 and 10 are sectional elevations of modified types of my valve.

Fig. 11 is an elevation of the top part of the boiler or tank with inlets and outlets and the modified type of my valve in a somewhat different location from that shown in Fig. 1.

Fig. 12 is another modified type of my valve, and

Fig. 13 is a sectional detail showing a modified type of pressure valve closure.

Fig. 14 is an elevation, partly in section, showing another place in which my valve can be located, together with a hot water inlet pipe.

Figure 1:
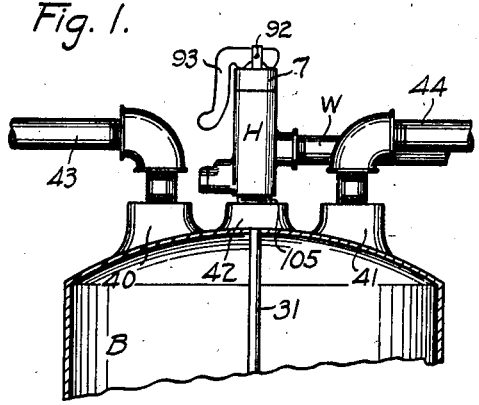

In the drawings in Figs. 1, 2, 3, 4, 5, 6 and 9, H represents a valve having a housing 106 in which is a cylindrical vertical operating or spring chamber 1, internally threaded at the top and having a waste outlet 3 in the side which is also preferably threaded to connect with a waste pipe W to conduct the waste water into any convenient place where it will do no damage.

At the bottom of chamber 1 and concentric with it, is a fixed pressure valve seat 4 at the top of an annular boss surrounding a passage 103 from an inlet chamber 2 positioned below the operating chamber and which connects through the inlet 5 with a boiler B. Inlet 5 is preferably on the inside of a threaded neck 105 which is screwed into a nipple 42 at the top of boiler B.

A is an annular plug having external threads 10, by which it is screwed into so as to form part of housing 106, and having a smooth axial cylindrical passage 11 in which tubular pressure valve stem P is slidable. 12 is the square top part of plug A by which the position of plug A can be regulated so as to change and adjust the force of pressure spring C positioned between it and the pressure valve seat closure 24 carried near the bottom of pressure valve stem P.

P is a tubular pressure valve stem slidable in passage 11, threaded on its top inside 111 for the solid plug 21 which is suitably threaded so as to be moved up or down inside stem P, and preferably sealed in position as by a lead seal 6. 107 is a plug screwed into the top of plug P having a hole 207 for the passage of rod 90 having a head 91.

As shown, I provide pressure valve testing means by which its seat and spring C can be tested from the outside. This includes an annular cap 7 through which preferably passes a rod 90 at the bottom of which is a head 91 and which is pivoted at 92 to a lever 93. By pulling up on lever 93, stem P is lifted, thus moving its valve seat closure 24 from pressure valve seat 4, as shown in Fig. 9. When the pressure in the boiler B is enough to overcome the force of spring C, this valve will open and the water will run off through inlet 5 and into chamber 2, out through chamber 1 into waste pipe W.

Tubular stem P at the bottom has a downwardly facing temperature valve seat 22 through which is a passage 23 which extends up and connects with an outlet 25 into chamber 1.

Figure 3:
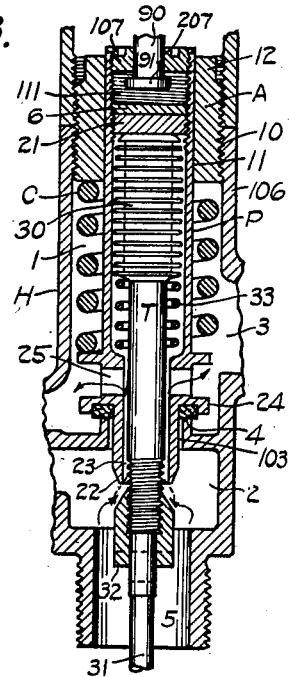

T represents a temperature release valve assembly on the inside of stem P, and includes an expansion bellows 30 inside stem P which is normally kept lifted by a light spring 33, but preferably not enough to cause it to engage plug 21. Connecting with and extending down from bellows 30 through valve seat 4, valve closure 24 and seat 22 is a sealed tube 31 which is filled with the same expansible liquid as the bellows 30 and extends down to the water in the boiler. This tube carries an annular closure member 32 adapted to engage and to close the temperature valve seat 22 until the water temperature in the boiler rises to a predetermined point, causing bellows 30 to expand until its top engages solid plug 21 and overcomes the pressure of light spring 33, thus separating member 32 from seat 22, as shown in Fig. 3.

The parts are so adjusted that while the water or fluid in the boiler may run up to 212 degrees, the fluid in the bellows will not be above 190 degrees. If so set, the expansion of the bellows will open the temperature release valve slightly, but enough so that the water in the boiler at a higher temperature flows quickly out into the spring chamber causing the bellows to expand much more. This opens the valve wide, allowing the water heated to the danger point to be discharged, as shown by the arrow in Fig. 3, at a very fast rate.

When the temperature of the water in and flowing from the boiler cools down to less than 190 degrees, the bellows quickly contracts, closing the temperature relief valve and stopping the waste. In other words, when the temperature in the boiler gets up to the danger point and only then, this relief valve opens slightly and then quickly and in full, thus releasing very rapidly.

Figure 2:
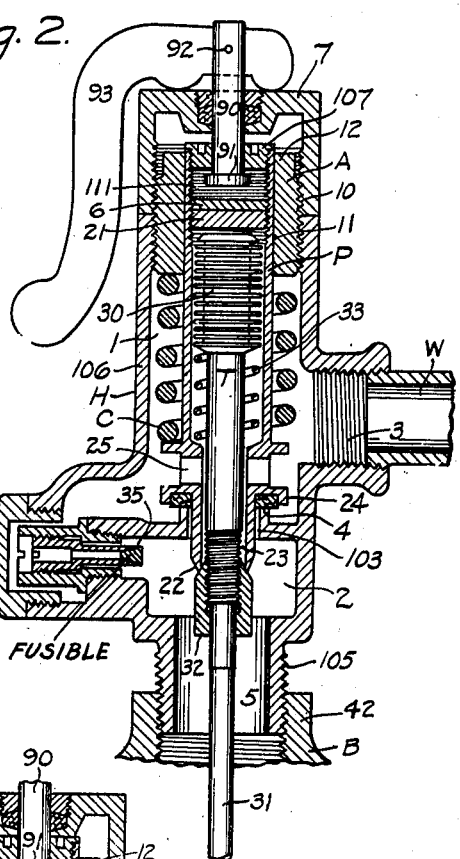
Fig. 2 is a sectional elevation of my preferred type of valve.

Normally, as shown in Fig. 2, the top of the bellows 30 does not engage plug 21.

Figure 4:
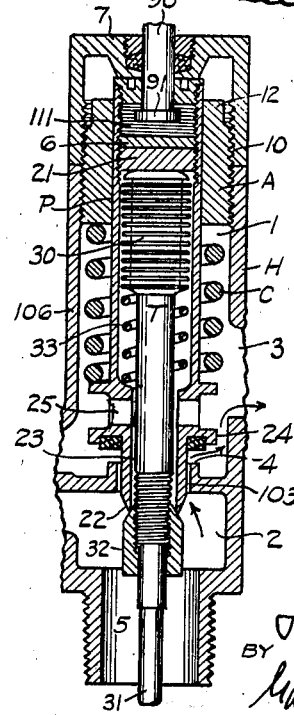

As shown in Fig. 4, when the pressure in the boiler rises above the predetermined point, the pressure valve closure 24 is lifted from the pressure valve seat 4, carrying with it the whole temperature regulating assembly T, and when the pressure is relieved, spring C returns this valve to its seat.

Obviously the temperature release valve may also open at the same time although each closure may work separately.

If a vacuum is created in the boiler, the atmospheric or back pressure draws the temperature closure 32 away from the seat 22, the back pressure pulling down the whole temperature regulating assembly T, compressing light spring 33 and allowing air to come back into the boiler through waste pipe W, as shown in Fig. 5, unless bellows holding spring 33 is strong enough to resist such atmospheric pressure.

If the pressure and temperature relief valves both fail to work and the temperature rises to a point above that at which the assembly T is set, the fusible plug 35 is melted and the steam and water under pressure are released along the route shown by the arrows in Fig. 6.

As shown in valve M. Fig. 10, the annular cap 7, rod 90 and lever 93 may be replaced by a simple closure cap 48 and the plug 21 may be replaced by a plug 49 with a slot for turning and with or without a lead seal such as 6.

The boiler B, such as shown in Fig. 1, has three nipples 40 for the hot water, 41 for the cold water and 42 for the valve. However, as shown in Fig. 11, a nipple 42 can be dispensed with and a valve such as H, or a valve F. such as shown in Figs. 12 and 13, can be attached to a connection 144 with a T 145 which is connected by a spud 146 with nipple 40, the hot water pipe 45 also connecting with the T 145.

In this valve F, the pressure release and the fusible plug are in the part 51 of the main casing 50 while the temperature release and the vacuum release are in another part 52 of the main casing.

The inlet 54 from the boiler is connected by passages 55 and 56 with the operating chambers 65 and 66 which are also connected by a passage 153 so that each communicates with the waste outlet 154.

The temperature release valve includes a downwardly extending temperature valve seat 61 which can be closed by a closure 62 carried by the sealed tube 63 which extends down from an expansion bellows 64 inside the operating chamber 65 through the valve seat and into the water of the boiler together with a light spring 68 which normally keeps this temperature valve closed. These parts operate in the same way as in the triple combination valve.

The pressure release assembly includes an upwardly extending valve seat 70 normally closed by a closure 71 operated by a compression spring 72 and, as shown, having through its middle a passage 73. As shown, the tube 74 with the fusible plug 75 at the bottom can be screwed about this passage 73 so that if the plug melts, the water can escape.

However, as shown in Fig. 13, the plug can be entirely omitted and a closure 77 with no passage through it can be used.

As shown in Fig. 7, in some cases, the valve K in which the pressure spring feature is omitted can be used to advantage, a separate pressure valve and a separate vacuum release valve and a separate fusible plug or any or all of them being used.

The valve K is similar to valve M, shown in Fig. 10, except that the compression spring C is removed and the top of the plug P is fastened to the closure cap 48 at the top by means of solder such as 47.

In Fig. 8, in the valve L, not only the pressure spring, such as C, is omitted, but the light spring or returning spring 33 is also omitted. The parts P and 48 are fixed and the pressure in the boiler or tank, such as B, is depended on to keep the bellows temperature valve normally closed.

Water pressure in the boiler can be depended upon to keep this valve normally closed even if the valve is upright, but if it is turned upside down, there is no need of a returning spring, or if horizontal, as shown in Fig. 14, such a valve will be seated without use of a spring.

As shown in Fig. 14, a valve such as X, which might be merely a temperature, a temperature and vacuum, a temperature and pressure valve or a temperature, pressure and vacuum valve, can be inserted in the side of the boiler B and the position shown is particularly good because the hottest water strikes it first, as shown by the arrow.

I claim:

1. A combined pressure, temperature and vacuum relief device for hot water systems, such as a hot water boiler, comprising a housing having an operating chamber with an inlet at the bottom and a waste outlet at the side, together with a fusible plug by-pass which connects the inlet and chamber and is closed by a fusible plug, and a fixed pressure valve seat between the inlet and chamber; an annular plug adjustable in the top of the chamber and having a pressure relief valve stem passage; a tubular pressure valve stem slidable through said passage having in the top an adjustable solid plug, near the bottom a pressure valve seat closure adapted to engage the fixed valve seat and at its bottom end a downwardly facing temperature valve seat through which is a passage which connects with an outlet from the stem interior to the chamber above the pressure valve closure; a compression pressure release spring which normally so engages the annular plug and the pressure valve stem as to keep the pressure valve closed; a temperature release valve closure member adapted to engage the temperature valve seat and carried by a sealed tube which extends down from an expansion bellows inside the tubular valve stem adjacent the solid plug through both valve seats and adapted to extend into the boiler, the tube and bellows being filled with an expansible fluid; and a light spring adapted to keep said tube and bellows normally raised to close the temperature valve, the bellows being out of engagement with the adjustable solid plug at safe temperature.

2. A combined pressure, temperature and vacuum relief device for hot water systems, such as a hot water boiler, comprising a housing having an operating chamber with an inlet chamber and inlet at the bottom, a waste outlet at the side, and a fixed pressure valve seat between the inlet and operating chambers; an annular plug adjustable in the top of the operating chamber and having a pressure relief valve stem passage; a tubular pressure valve stem slidable through said passage having in the top an adjustable solid plug, near the bottom a pressure valve seat closure adapted to engage the fixed pressure valve seat and at its bottom end a downwardly facing temperature valve seat through which is a passage which connects with an outlet from the stem interior to the operating chamber above the pressure valve closure; a compression pressure release spring which normally so engages the pressure valve stem as to keep the pressure valve closed; a temperature release valve closure assembly including a closure member adapted to engage the temperature valve seat and carried by a sealed tube which extends down from an expansion bellows inside the tubular valve stem adjacent the solid plug through both valve seats and adapted to project into the boiler; and a light spring adapted to keep said tube and bellows normally raised, and the temperature valve closed.

3. A combined temperature and vacuum relief device for hot water systems, such as a hot water boiler, comprising a housing having an operating chamber with an inlet at the bottom, a waste outlet and at its bottom end a downwardly facing temperature valve seat; a temperature release valve closure assembly including a closure member adapted to engage the temperature valve seat which is carried by a sealed tube which extends from an expansion bellows located above the valve seat down through the valve seat and adapted to extend into the boiler; and a light spring adapted to keep said tube and bellows normally raised, and the temperature valve closed.

4. A combined pressure, temperature and vacuum relief device for hot water systems, such as a hot water boiler, comprising a single housing which has an operating chamber having a main inlet opening and a waste discharge outlet, a single passage in said housing leading from the inlet opening through a pressure valve seat to the waste outlet, a movable pressure valve stem with a closure valve spring for closing the pressure valve seat, said stem carrying at the bottom a downwardly facing temperature valve seat through which is a passage with an outlet through the stem connecting with the waste outlet, said stem being adapted to open by excess pressure in said inlet, a movable valve closure carried by a closed tube extending down through the downwardly facing temperature valve seat from a temperature operable bellows inside said housing for closing the movable temperature valve seat at the bottom of the stem, and a light spring to normally keep the temperature valve seat and closure engaged.

THOMAS P. McDERMOTT.